(12) United States Patent
Caron et al.

(10) Patent No.: US 11,558,593 B2
(45) Date of Patent: Jan. 17, 2023

(54) SCENE-BASED AUTOMATIC WHITE BALANCE

(71) Applicant: GoPro, Inc., San Mateo, CA (US)

(72) Inventors: Julien Caron, Guyancourt (FR); Thomas Armel Derbanne, Paris (FR); Antoine Monod, Paris (FR)

(73) Assignee: GoPro, Inc., San Mateo, CA (US)

( * ) Notice: Subject to any disclaimer, the term of this patent is extended or adjusted under 35 U.S.C. 154(b) by 167 days.

(21) Appl. No.: 17/171,258

(22) Filed: Feb. 9, 2021

(65) Prior Publication Data
US 2021/0250565 A1 Aug. 12, 2021

Related U.S. Application Data

(60) Provisional application No. 62/972,191, filed on Feb. 10, 2020.

(51) Int. Cl.
| | |
|---|---|
| *H04N 9/73* | (2006.01) |
| *G06T 5/40* | (2006.01) |
| *G06K 9/62* | (2022.01) |
| *G06V 10/56* | (2022.01) |
| *G06V 20/00* | (2022.01) |
| *G06V 40/16* | (2022.01) |

(52) U.S. Cl.
CPC ........... *H04N 9/735* (2013.01); *G06K 9/6277* (2013.01); *G06T 5/40* (2013.01); *G06V 10/56* (2022.01); *G06V 20/00* (2022.01); *G06V 40/166* (2022.01); *G06T 2207/10024* (2013.01); *G06T 2207/20081* (2013.01)

(58) Field of Classification Search
CPC ..................................... H04N 9/735
USPC ..................................... 348/223.1
See application file for complete search history.

(56) References Cited

U.S. PATENT DOCUMENTS 11,064,113 B1 * 7/2021 Weber .................... H04N 5/232

FOREIGN PATENT DOCUMENTS

CN 101256597 * 9/2008

OTHER PUBLICATIONS

Barron, J. T., & Tsai, Y. T. (2017). "Fast fourier color constancy". In Proceedings of the IEEE Conference on Computer Vision and Pattern Recognition (pp. 886-894).

* cited by examiner

*Primary Examiner* — Joel W Fosselman
(74) *Attorney, Agent, or Firm* — Young Basile Hanlon & MacFarlane, P.C.

(57) ABSTRACT

A method and apparatus may be used for performing a scene-based automatic white balance correction. The method may include obtaining an input image. The method may include obtaining a raw image thumbnail. The method may include obtaining an augmented image thumbnail. The method may include computing a histogram from an image thumbnail. The method may include determining a scene classification. The method may include learning a filter. The filter may be learned from one or several different instances of the raw image thumbnail, the augmented image thumbnail, the scene classification, or any combination thereof. The method may include applying the filter to the histogram to determine white balance correction coefficients and obtain a processed image.

20 Claims, 10 Drawing Sheets

SCENE-BASED AUTOMATIC WHITE BALANCE

CROSS-REFERENCE TO RELATED APPLICATION(S)

This application claims priority to and the benefit of U.S. Provisional Patent Application No. 62/972,191, filed Feb. 10, 2020, the entire disclosure of which is hereby incorporated by reference.

TECHNICAL FIELD

This disclosure relates to image capture devices and image processing.

BACKGROUND

Image capture devices, such as cameras, may capture content as images or video. Light may be received and focused via a lens and may be converted to an electronic image signal by an image sensor. The image signal may be processed by an image signal processor to form an image, which may be stored, encoded, or both. The configurations used by the image capture device to capture the images or video may in some cases have an effect on the overall quality of the images or video. For example, typical automatic white balance (AWB) correction is slow and inaccurate.

SUMMARY

Disclosed herein are implementations of scene-based automatic white balance methods and devices. In an aspect, an image capture device may include an image sensor and a processor. The image sensor may be configured to obtain an input image. The processor may be configured to obtain a raw image thumbnail, a first augmented image thumbnail, a second augmented image thumbnail, or any combination thereof. The raw image thumbnail may be used to compute or determine a first histogram. The first augmented image thumbnail may be used to compute or determine a second histogram. The second augmented image thumbnail may be used to compute or determine a third histogram. The processor may be configured to determine a scene classification for the input image or use external scene classification information based on the input image or recently acquired images. The processor may be configured to learn one or more filters using multiple different image thumbnails and scene classification information. For example, a first filter may be learned from one or more different instances of the raw image thumbnail and the determined scene classification, a second filter may be learned from one or more different instances of the first augmented image thumbnail and the determined scene classification, and a third filter may be learned from one or several different instances of the second augmented image thumbnail and the determined scene classification. The processor may be configured to output or store the one or more filters.

In another aspect, an image capture device may include an image sensor and a processor. The image sensor may be configured to obtain an input image. The processor may be configured to obtain a raw image thumbnail based on the input image and compute or determine a first histogram based on the raw image thumbnail. The processor may be configured to obtain a first augmented image thumbnail. The first augmented image thumbnail may be based on the raw image thumbnail and may be used to determine a second histogram. The processor may be configured to obtain a second augmented image thumbnail. The second augmented image thumbnail may be based on the raw image thumbnail and may be used to determine a third histogram. The processor may be configured to determine a scene classification for the input image or use external scene classification information based on the input image or recently acquired images. The processor may be configured to obtain a previously learned first filter, a previously learned second filter, a previously learned third filter, or any combination thereof. The processor may be configured to perform a convolution of the first filter with the first histogram. The processor may be configured to perform a convolution of the second filter with the second histogram. The processor may be configured to perform a convolution of the third filter with the third histogram. The processor may be configured to perform a combination of the convolutions by filters to obtain a representation of the light source in the input image. The processor may be configured to compute scene-specific white balance weights from the representation of the light source. The processor may be configured to apply the scene-specific white balance weights to the input image to obtain a processed image. The processor may be configured to output the processed image.

Another aspect may include a method for performing a scene-based automatic white balance correction. The method may include obtaining an input image. The method may include obtaining a raw image thumbnail. The method may include obtaining an augmented image thumbnail. The method may include computing histograms from the image thumbnails. The method may include determining a scene classification. The method may include learning or obtaining one or more filters. The filters may be learned using multiple different image thumbnails and scene classification information. The method may include combining convolutions of histograms by filters to determine scene-specific white balance weights and obtain a processed image.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

An image capture device may capture content as images or video. An image capture device may have inherent characteristics that may impact the final image or video. For example, the color sensitivity of each image capture device and the color of the light cast on the scene may affect what color is being seen in an image. Automatic white balance (AWB) processing is the process of removing unrealistic color casts.

Implementations of this disclosure address problems using AWB processing to improve AWB performance, speed, and flexibility by using scene information. The embodiments disclosed herein include a learning step using labeled images with reference AWB results and additional information, including, for example, metadata, scene information, or both. The additional information may be obtained from the same frame or past frames. Learned parameters may include two-dimensional (2D) filters that may be used to find the log-chrominance representation of the light cast on the scene in a raw image. This position may be used for image white balance correction.

The scene information (i.e., scene classification output) may be obtained using a scene classification algorithm that may be separate or a part of a learning-based AWB algorithm. The scene classification output may be used to improve the accuracy of the AWB correction. The scene classification output may be used to learn scene-specific filters. The scene classification output may disambiguate some cases of metamerisms frequently encountered in photography and videography. The scene-based AWB algorithm may be implemented in an image capture device. Computational complexity may be kept low by combining filters before convolution with log-chrominance histograms.

The implementations of this disclosure are described in detail with reference to the drawings, which are provided as examples so as to enable those skilled in the art to practice the technology. The figures and examples are not meant to limit the scope of the present disclosure to a single implementation or embodiment, and other implementations and embodiments are possible by way of interchange of, or combination with, some or all of the described or illustrated elements. Wherever convenient, the same reference numbers will be used throughout the drawings to refer to same or like parts.

Figure 1A:
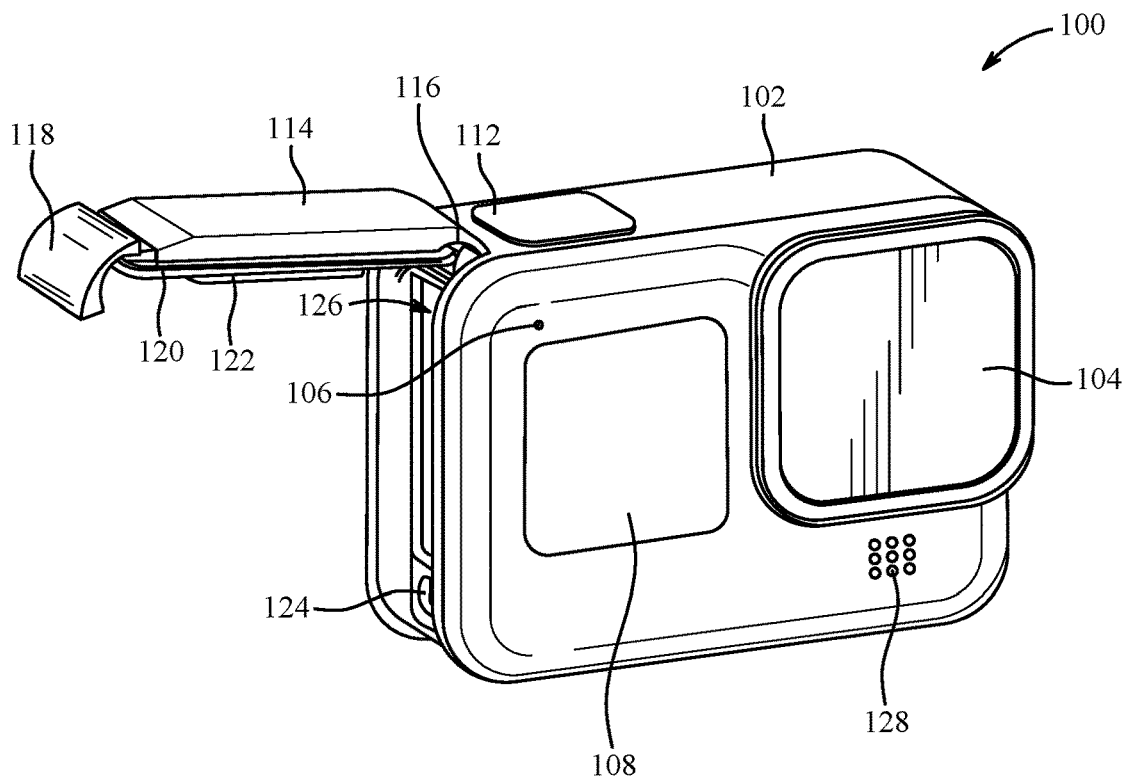
FIGS. 1A-B are isometric views of an example of an image capture device.
Figure 1B:
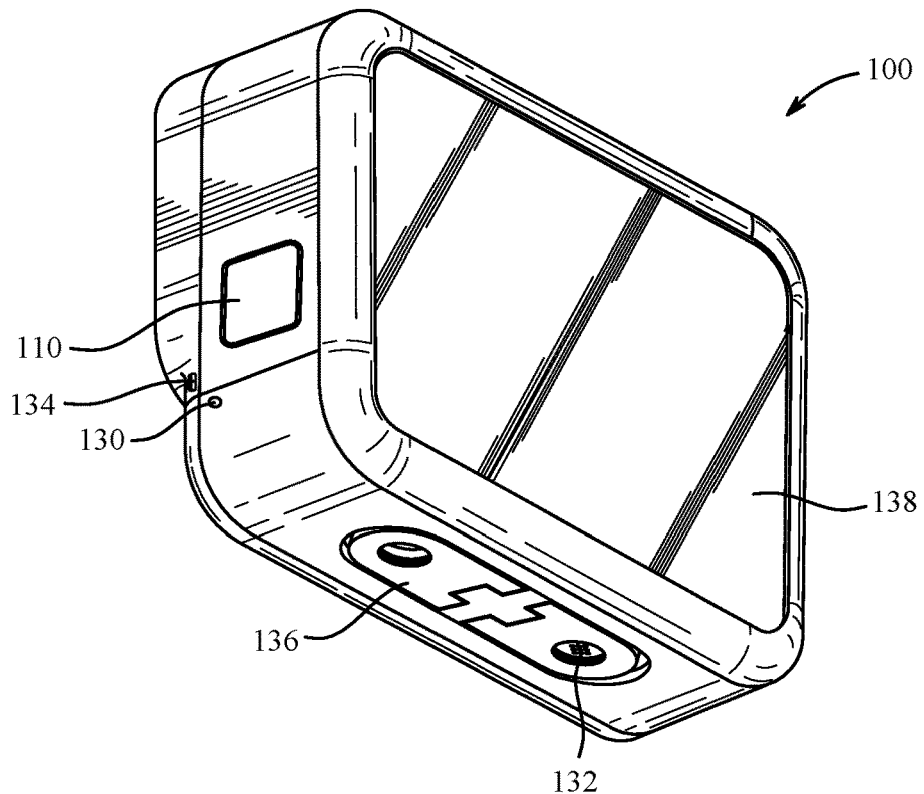

FIGS. 1A-B are isometric views of an example of an image capture device 100. The image capture device 100 may include a body 102, a lens 104 structured on a front surface of the body 102, various indicators on the front surface of the body 102 (such as light-emitting diodes (LEDs), displays, and the like), various input mechanisms (such as buttons, switches, and/or touch-screens), and electronics (such as imaging electronics, power electronics, etc.) internal to the body 102 for capturing images via the lens 104 and/or performing other functions. The lens 104 is configured to receive light incident upon the lens 104 and to direct received light onto an image sensor internal to the body 102. The image capture device 100 may be configured to capture images and video and to store captured images and video for subsequent display or playback.

The image capture device 100 may include an LED or another form of indicator 106 to indicate a status of the image capture device 100 and a liquid-crystal display (LCD) or other form of a display 108 to show status information such as battery life, camera mode, elapsed time, and the like. The image capture device 100 may also include a mode button 110 and a shutter button 112 that are configured to allow a user of the image capture device 100 to interact with the image capture device 100. For example, the mode button 110 and the shutter button 112 may be used to turn the image capture device 100 on and off, scroll through modes and settings, and select modes and change settings. The image capture device 100 may include additional buttons or interfaces (not shown) to support and/or control additional functionality.

The image capture device 100 may include a door 114 coupled to the body 102, for example, using a hinge mechanism 116. The door 114 may be secured to the body 102 using a latch mechanism 118 that releasably engages the body 102 at a position generally opposite the hinge mechanism 116. The door 114 may also include a seal 120 and a battery interface 122. When the door 114 is an open position, access is provided to an input-output (I/O) interface 124 for connecting to or communicating with external devices as described below and to a battery receptacle 126 for placement and replacement of a battery (not shown). The battery receptacle 126 includes operative connections (not shown) for power transfer between the battery and the image capture device 100. When the door 114 is in a closed position, the seal 120 engages a flange (not shown) or other interface to provide an environmental seal, and the battery interface 122 engages the battery to secure the battery in the battery receptacle 126. The door 114 can also have a removed position (not shown) where the entire door 114 is separated from the image capture device 100, that is, where both the hinge mechanism 116 and the latch mechanism 118 are decoupled from the body 102 to allow the door 114 to be removed from the image capture device 100.

The image capture device 100 may include a microphone 128 on a front surface and another microphone 130 on a side surface. The image capture device 100 may include other microphones on other surfaces (not shown). The microphones 128, 130 may be configured to receive and record audio signals in conjunction with recording video or separate from recording of video. The image capture device 100 may include a speaker 132 on a bottom surface of the image capture device 100. The image capture device 100 may include other speakers on other surfaces (not shown). The speaker 132 may be configured to play back recorded audio or emit sounds associated with notifications.

A front surface of the image capture device 100 may include a drainage channel 134. A bottom surface of the image capture device 100 may include an interconnect mechanism 136 for connecting the image capture device 100 to a handle grip or other securing device. In the example shown in FIG. 1B, the interconnect mechanism 136 includes folding protrusions configured to move between a nested or collapsed position as shown and an extended or open position (not shown) that facilitates coupling of the protrusions to mating protrusions of other devices such as handle grips, mounts, clips, or like devices.

The image capture device 100 may include an interactive display 138 that allows for interaction with the image capture device 100 while simultaneously displaying information on a surface of the image capture device 100.

The image capture device 100 of FIGS. 1A-B includes an exterior that encompasses and protects internal electronics. In the present example, the exterior includes six surfaces (i.e. a front face, a left face, a right face, a back face, a top face, and a bottom face) that form a rectangular cuboid. Furthermore, both the front and rear surfaces of the image capture device 100 are rectangular. In other embodiments, the exterior may have a different shape. The image capture device 100 may be made of a rigid material such as plastic, aluminum, steel, or fiberglass. The image capture device 100 may include features other than those described here. For example, the image capture device 100 may include additional buttons or different interface features, such as interchangeable lenses, cold shoes, and hot shoes that can add functional features to the image capture device 100.

The image capture device 100 may include various types of image sensors, such as charge-coupled device (CCD) sensors, active pixel sensors (APS), complementary metal-oxide-semiconductor (CMOS) sensors, N-type metal-oxide-semiconductor (NMOS) sensors, and/or any other image sensor or combination of image sensors.

Although not illustrated, in various embodiments, the image capture device 100 may include other additional electrical components (e.g., an image processor, camera system-on-chip (SoC), etc.), which may be included on one or more circuit boards within the body 102 of the image capture device 100.

The image capture device 100 may interface with or communicate with an external device, such as an external user interface device (not shown), via a wired or wireless computing communication link (e.g., the I/O interface 124). Any number of computing communication links may be used. The computing communication link may be a direct computing communication link or an indirect computing communication link, such as a link including another device or a network, such as the internet, may be used.

In some implementations, the computing communication link may be a Wi-Fi link, an infrared link, a Bluetooth (BT) link, a cellular link, a ZigBee link, a near field communications (NFC) link, such as an ISO/IEC 20643 protocol link, an Advanced Network Technology interoperability (ANT+) link, and/or any other wireless communications link or combination of links.

In some implementations, the computing communication link may be an HDMI link, a USB link, a digital video interface link, a display port interface link, such as a Video Electronics Standards Association (VESA) digital display interface link, an Ethernet link, a Thunderbolt link, and/or other wired computing communication link.

The image capture device 100 may transmit images, such as panoramic images, or portions thereof, to the external user interface device via the computing communication link, and the external user interface device may store, process, display, or a combination thereof the panoramic images.

The external user interface device may be a computing device, such as a smartphone, a tablet computer, a phablet, a smart watch, a portable computer, personal computing device, and/or another device or combination of devices configured to receive user input, communicate information with the image capture device 100 via the computing communication link, or receive user input and communicate information with the image capture device 100 via the computing communication link.

The external user interface device may display, or otherwise present, content, such as images or video, acquired by the image capture device 100. For example, a display of the external user interface device may be a viewport into the three-dimensional space represented by the panoramic images or video captured or created by the image capture device 100.

The external user interface device may communicate information, such as metadata, to the image capture device 100. For example, the external user interface device may send orientation information of the external user interface device with respect to a defined coordinate system to the image capture device 100, such that the image capture device 100 may determine an orientation of the external user interface device relative to the image capture device 100.

Based on the determined orientation, the image capture device 100 may identify a portion of the panoramic images or video captured by the image capture device 100 for the image capture device 100 to send to the external user interface device for presentation as the viewport. In some implementations, based on the determined orientation, the image capture device 100 may determine the location of the external user interface device and/or the dimensions for viewing of a portion of the panoramic images or video.

The external user interface device may implement or execute one or more applications to manage or control the image capture device 100. For example, the external user interface device may include an application for controlling camera configuration, video acquisition, video display, or any other configurable or controllable aspect of the image capture device 100.

The user interface device, such as via an application, may generate and share, such as via a cloud-based or social media service, one or more images, or short video clips, such as in response to user input. In some implementations, the external user interface device, such as via an application, may remotely control the image capture device 100 such as in response to user input.

The external user interface device, such as via an application, may display unprocessed or minimally processed images or video captured by the image capture device 100 contemporaneously with capturing the images or video by the image capture device 100, such as for shot framing or live preview, and which may be performed in response to user input. In some implementations, the external user interface device, such as via an application, may mark one or more key moments contemporaneously with capturing the images or video by the image capture device 100, such as with a tag or highlight in response to a user input or user gesture.

The external user interface device, such as via an application, may display or otherwise present marks or tags associated with images or video, such as in response to user input. For example, marks may be presented in a camera roll application for location review and/or playback of video highlights.

The external user interface device, such as via an application, may wirelessly control camera software, hardware, or both. For example, the external user interface device may include a web-based graphical interface accessible by a user for selecting a live or previously recorded video stream from the image capture device 100 for display on the external user interface device.

The external user interface device may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture device 100.

Figure 6:
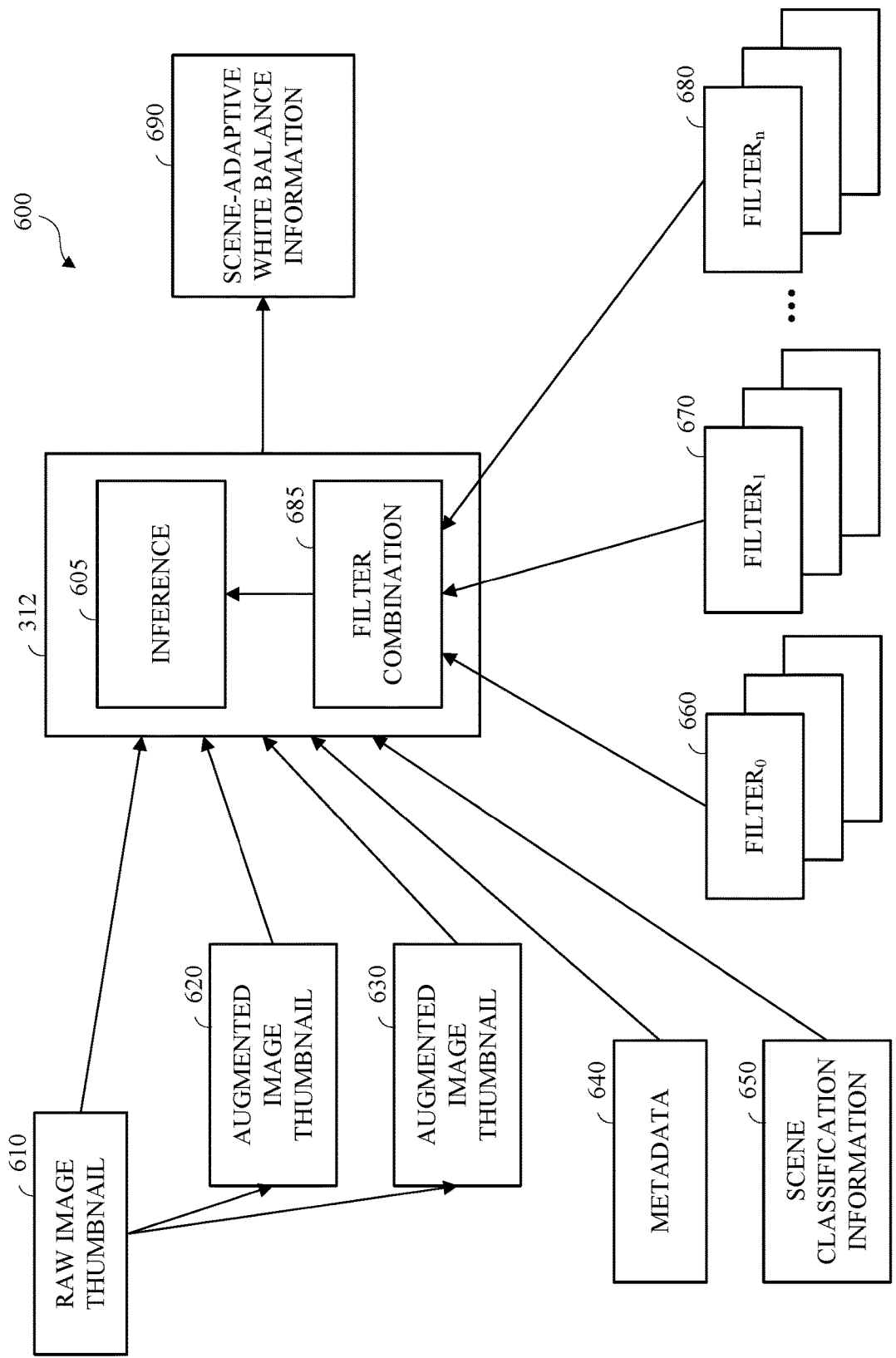
FIG. 6 is a flow diagram of an example of an in-device scene-based automatic white balance method.

The image capture device 100 may be used to implement some or all of the techniques described in this disclosure, such as the technique 600 described in FIG. 6.

Figure 2A:
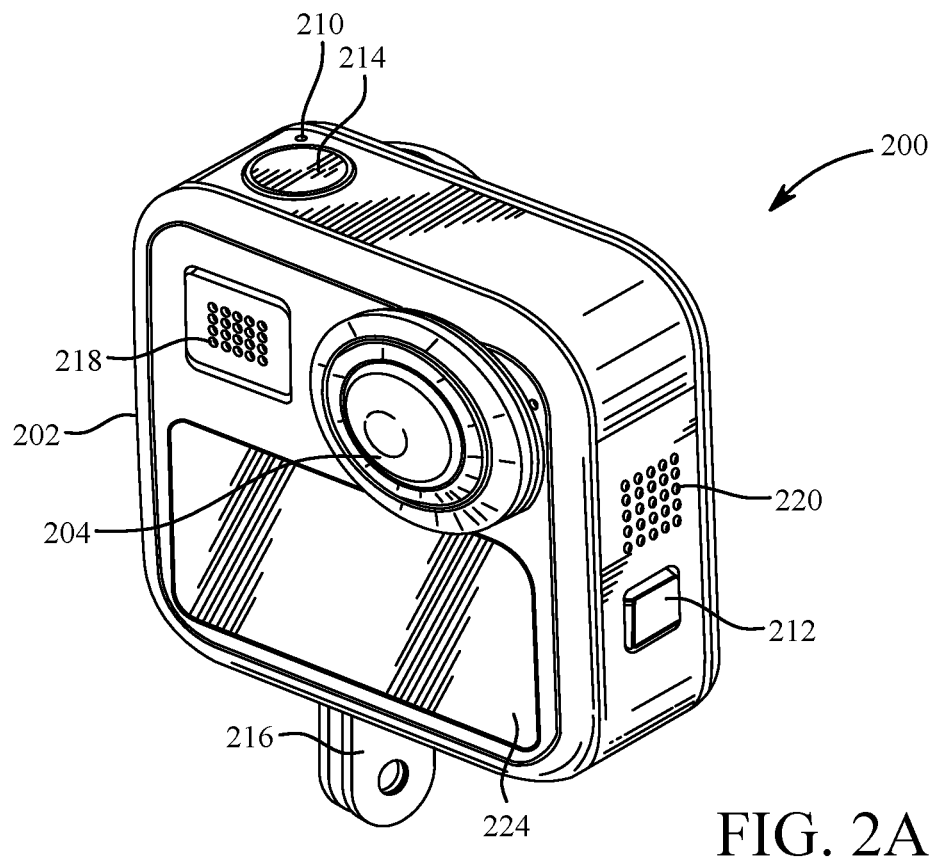
FIGS. 2A-B are isometric views of another example of an image capture device.
Figure 2B:
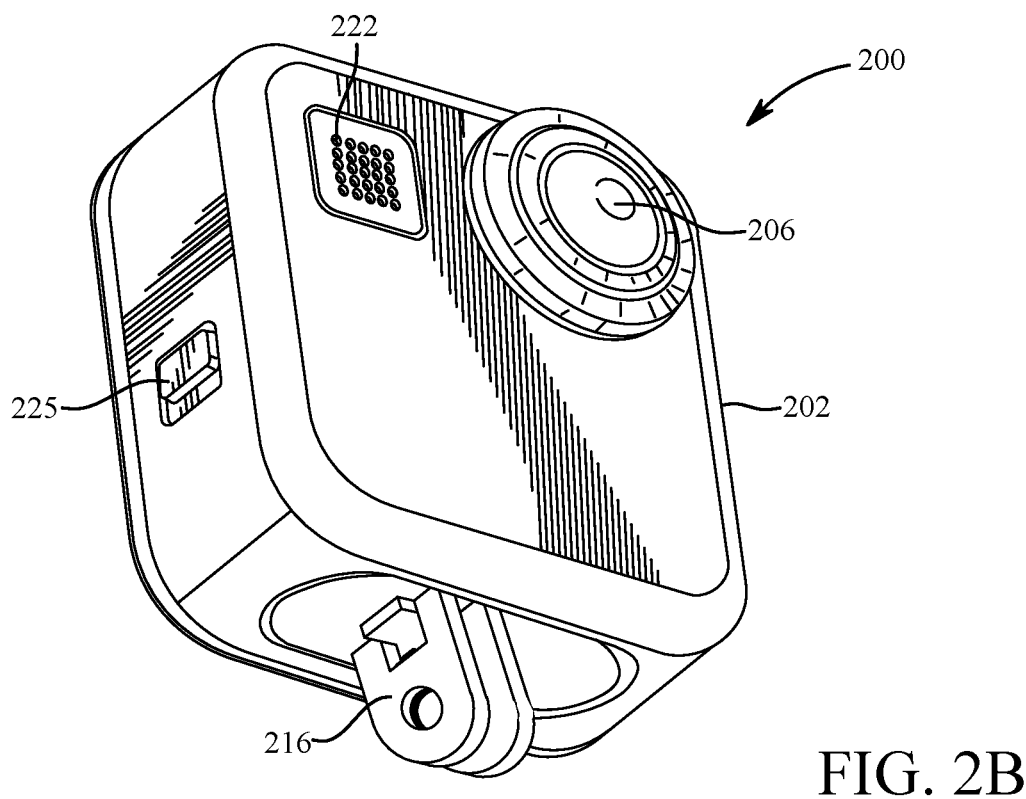

FIGS. 2A-B illustrate another example of an image capture device 200. The image capture device 200 includes a body 202 and two camera lenses 204 and 206 disposed on opposing surfaces of the body 202, for example, in a back-to-back configuration, Janus configuration, or offset Janus configuration. The body 202 of the image capture device 200 may be made of a rigid material such as plastic, aluminum, steel, or fiberglass.

The image capture device 200 includes various indicators on the front of the surface of the body 202 (such as LEDs, displays, and the like), various input mechanisms (such as buttons, switches, and touch-screen mechanisms), and electronics (e.g., imaging electronics, power electronics, etc.) internal to the body 202 that are configured to support image capture via the two camera lenses 204 and 206 and/or perform other imaging functions.

The image capture device 200 includes various indicators, for example, LEDs 208, 210 to indicate a status of the image capture device 100. The image capture device 200 may include a mode button 212 and a shutter button 214 configured to allow a user of the image capture device 200 to interact with the image capture device 200, to turn the image capture device 200 on, and to otherwise configure the operating mode of the image capture device 200. It should be appreciated, however, that, in alternate embodiments, the image capture device 200 may include additional buttons or inputs to support and/or control additional functionality.

The image capture device 200 may include an interconnect mechanism 216 for connecting the image capture device 200 to a handle grip or other securing device. In the example shown in FIGS. 2A and 2B, the interconnect mechanism 216 includes folding protrusions configured to move between a nested or collapsed position (not shown) and an extended or open position as shown that facilitates coupling of the protrusions to mating protrusions of other devices such as handle grips, mounts, clips, or like devices.

The image capture device 200 may include audio components 218, 220, 222 such as microphones configured to receive and record audio signals (e.g., voice or other audio commands) in conjunction with recording video. The audio component 218, 220, 222 can also be configured to play back audio signals or provide notifications or alerts, for example, using speakers. Placement of the audio components 218, 220, 222 may be on one or more of several surfaces of the image capture device 200. In the example of FIGS. 2A and 2B, the image capture device 200 includes three audio components 218, 220, 222, with the audio component 218 on a front surface, the audio component 220 on a side surface, and the audio component 222 on a back surface of the image capture device 200. Other numbers and configurations for the audio components are also possible.

The image capture device 200 may include an interactive display 224 that allows for interaction with the image capture device 200 while simultaneously displaying information on a surface of the image capture device 200. The interactive display 224 may include an I/O interface, receive touch inputs, display image information during video capture, and/or provide status information to a user. The status information provided by the interactive display 224 may include battery power level, memory card capacity, time elapsed for a recorded video, etc.

The image capture device 200 may include a release mechanism 225 that receives a user input to in order to change a position of a door (not shown) of the image capture device 200. The release mechanism 225 may be used to open the door (not shown) in order to access a battery, a battery receptacle, an I/O interface, a memory card interface, etc. (not shown) that are similar to components described in respect to the image capture device 100 of FIGS. 1A and 1B.

In some embodiments, the image capture device 200 described herein includes features other than those described. For example, instead of the I/O interface and the interactive display 224, the image capture device 200 may include additional interfaces or different interface features. For example, the image capture device 200 may include additional buttons or different interface features, such as interchangeable lenses, cold shoes, and hot shoes that can add functional features to the image capture device 200.

Figure 2C:
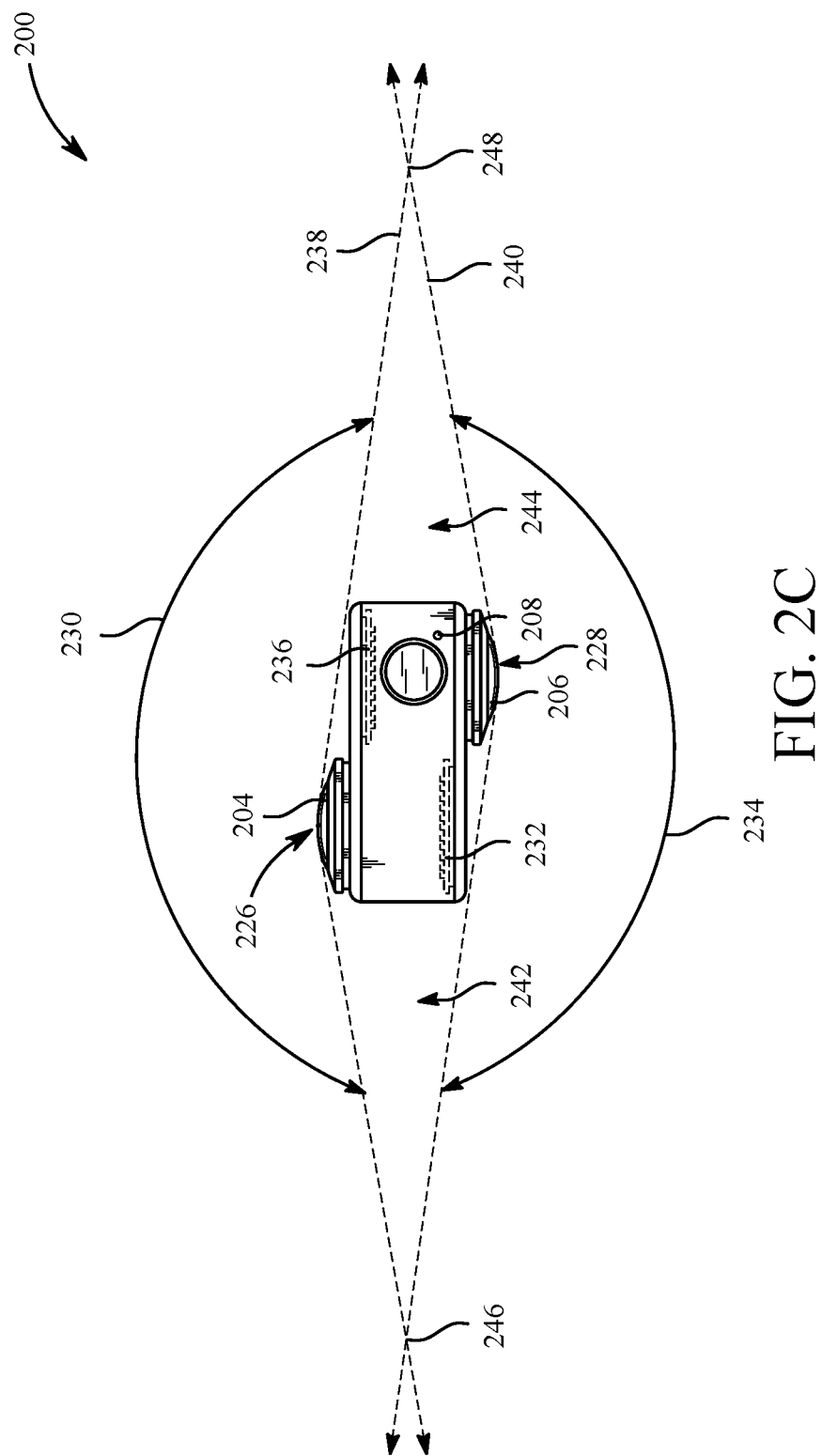
FIG. 2C is a top view of the image capture device of FIGS. 2A-B.
Figure 2D:
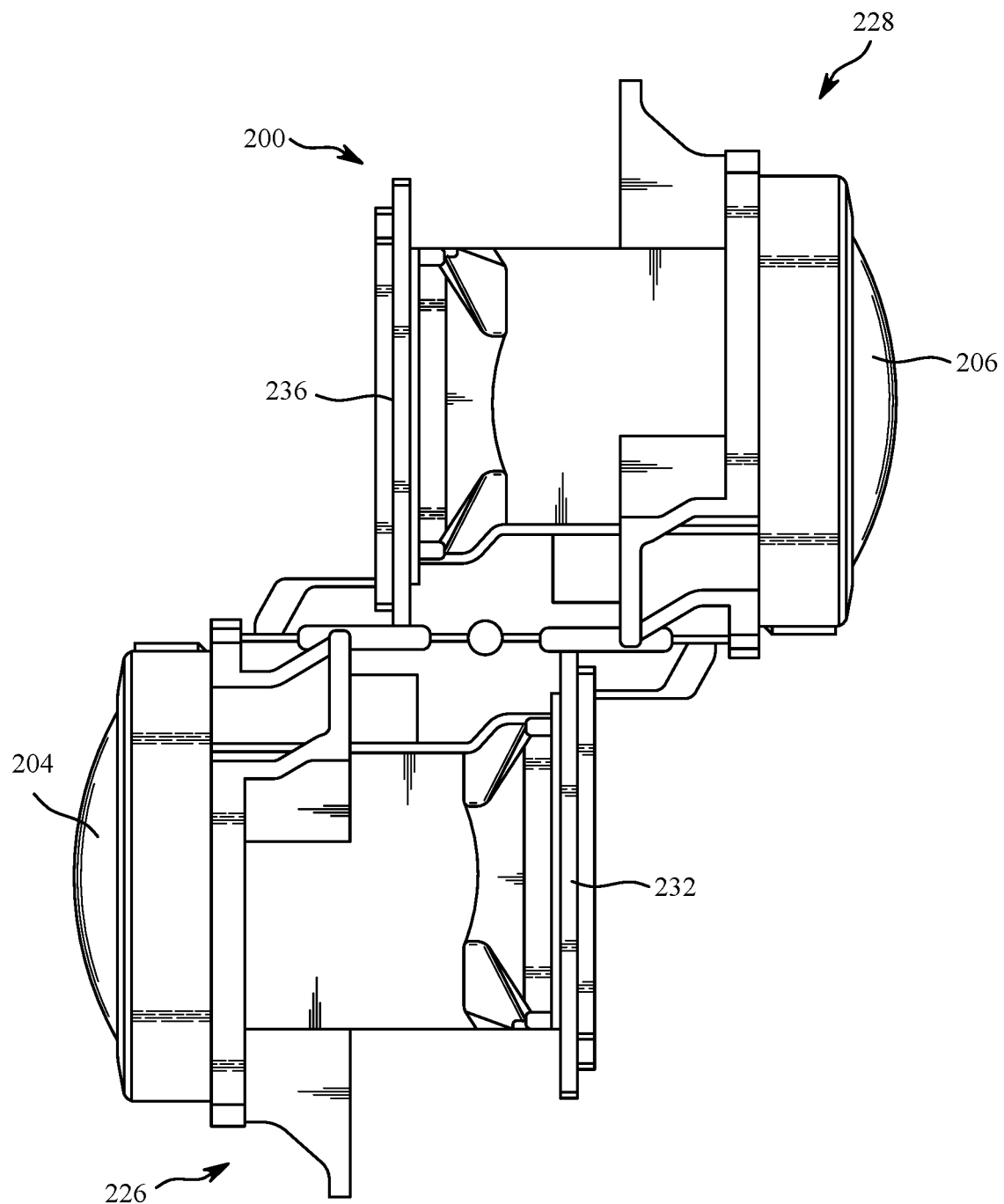
FIG. 2D is a partial cross-sectional view of the image capture device of FIG. 2C.

FIG. 2C is a top view of the image capture device 200 of FIGS. 2A-B and FIG. 2D is a partial cross-sectional view of the image capture device 200 of FIG. 2C. The image capture device 200 is configured to capture spherical images, and accordingly, includes a first image capture device 226 and a second image capture device 228. The first image capture device 226 defines a first field-of-view 230 and includes the lens 204 that receives and directs light onto a first image sensor 232. Similarly, the second image capture device 228 defines a second field-of-view 234 and includes the lens 206 that receives and directs light onto a second image sensor 236. To facilitate the capture of spherical images, the image capture devices 226 and 228 (and related components) may be arranged in a back-to-back (Janus) configuration such that the lenses 204, 206 face in generally opposite directions.

The fields-of-view 230, 234 of the lenses 204, 206 are shown above and below boundaries 238, 240 indicated in dotted line. Behind the first lens 204, the first image sensor 232 may capture a first hyper-hemispherical image plane from light entering the first lens 204, and behind the second lens 206, the second image sensor 236 may capture a second hyper-hemispherical image plane from light entering the second lens 206.

One or more areas, such as blind spots 242, 244 may be outside of the fields-of-view 230, 234 of the lenses 204, 206 so as to define a "dead zone." In the dead zone, light may be obscured from the lenses 204, 206 and the corresponding image sensors 232, 236, and content in the blind spots 242, 244 may be omitted from capture. In some implementations, the image capture devices 226, 228 may be configured to minimize the blind spots 242, 244.

The fields-of-view 230, 234 may overlap. Stitch points 246, 248 proximal to the image capture device 200, that is, locations at which the fields-of-view 230, 234 overlap, may be referred to herein as overlap points or stitch points. Content captured by the respective lenses 204, 206 that is distal to the stitch points 246, 248 may overlap.

Images contemporaneously captured by the respective image sensors 232, 236 may be combined to form a combined image. Generating a combined image may include correlating the overlapping regions captured by the respective image sensors 232, 236, aligning the captured fields-of-view 230, 234, and stitching the images together to form a cohesive combined image.

A slight change in the alignment, such as position and/or tilt, of the lenses 204, 206, the image sensors 232, 236, or both, may change the relative positions of their respective fields-of-view 230, 234 and the locations of the stitch points 246, 248. A change in alignment may affect the size of the blind spots 242, 244, which may include changing the size of the blind spots 242, 244 unequally.

Incomplete or inaccurate information indicating the alignment of the image capture devices 226, 228, such as the locations of the stitch points 246, 248, may decrease the accuracy, efficiency, or both of generating a combined image. In some implementations, the image capture device 200 may maintain information indicating the location and orientation of the lenses 204, 206 and the image sensors 232, 236 such that the fields-of-view 230, 234, the stitch points 246, 248, or both may be accurately determined; the maintained information may improve the accuracy, efficiency, or both of generating a combined image.

The lenses 204, 206 may be laterally offset from each other, may be off-center from a central axis of the image capture device 200, or may be laterally offset and off-center from the central axis. As compared to image capture devices with back-to-back lenses, such as lenses aligned along the same axis, image capture devices including laterally offset lenses may include substantially reduced thickness relative to the lengths of the lens barrels securing the lenses. For example, the overall thickness of the image capture device 200 may be close to the length of a single lens barrel as opposed to twice the length of a single lens barrel as in a back-to-back lens configuration. Reducing the lateral distance between the lenses 204, 206 may improve the overlap in the fields-of-view 230, 234. In another embodiment (not shown), the lenses 204, 206 may be aligned along a common imaging axis.

Images or frames captured by the image capture devices 226, 228 may be combined, merged, or stitched together to produce a combined image, such as a spherical or panoramic image, which may be an equirectangular planar image. In some implementations, generating a combined image may include use of techniques including noise reduction, tone mapping, white balancing, or other image correction. In some implementations, pixels along the stitch boundary may be matched accurately to minimize boundary discontinuities.

The image capture device 200 may be used to implement some or all of the techniques described in this disclosure, such as the technique 600 described in FIG. 6.

Figure 3:
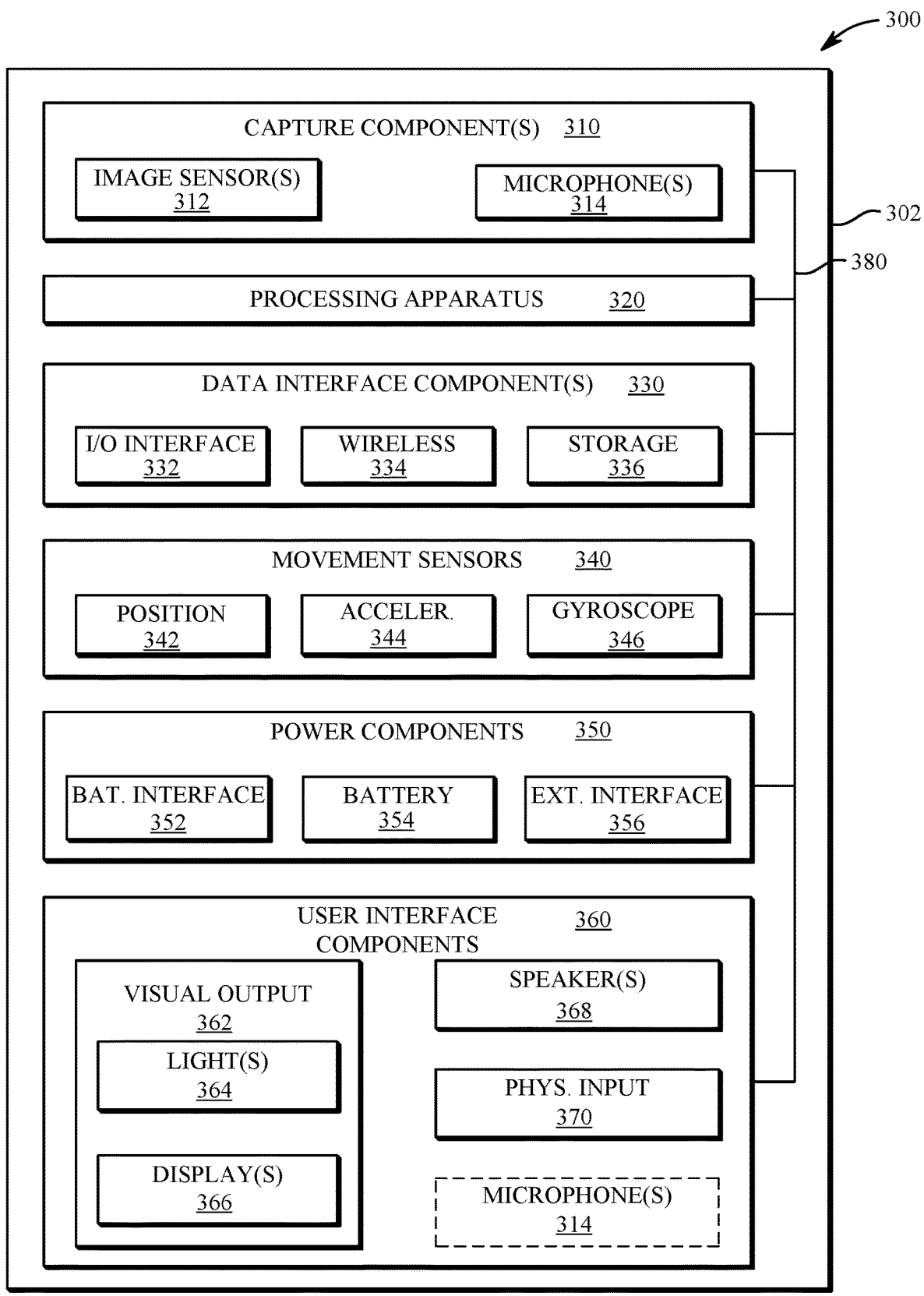
FIG. 3 is a block diagram of electronic components of an image capture device.

FIG. 3 is a block diagram of electronic components in an image capture device 300. The image capture device 300 may be a single-lens image capture device, a multi-lens image capture device, or variations thereof, including an image capture device with multiple capabilities such as use of interchangeable integrated sensor lens assemblies. The description of the image capture device 300 is also applicable to the image capture devices 100, 200 of FIGS. 1A-B and 2A-D.

The image capture device 300 includes a body 302 which includes electronic components such as capture components 310, a processing apparatus 320, data interface components 330, movement sensors 340, power components 350, and/or user interface components 360.

The capture components 310 include one or more image sensors 312 for capturing images and one or more microphones 314 for capturing audio.

The image sensor(s) 312 is configured to detect light of a certain spectrum (e.g., the visible spectrum or the infrared spectrum) and convey information constituting an image as electrical signals (e.g., analog or digital signals). The image sensor(s) 312 detects light incident through a lens coupled or connected to the body 302. The image sensor(s) 312 may be any suitable type of image sensor, such as a charge-coupled device (CCD) sensor, active pixel sensor (APS), complementary metal-oxide-semiconductor (CMOS) sensor, N-type metal-oxide-semiconductor (NMOS) sensor, and/or any other image sensor or combination of image sensors. Image signals from the image sensor(s) 312 may be passed to other electronic components of the image capture device 300 via a bus 380, such as to the processing apparatus 320. In some implementations, the image sensor(s) 312 includes a digital-to-analog converter. A multi-lens variation of the image capture device 300 can include multiple image sensors 312.

The microphone(s) 314 is configured to detect sound, which may be recorded in conjunction with capturing images to form a video. The microphone(s) 314 may also detect sound in order to receive audible commands to control the image capture device 300.

The processing apparatus 320 may be configured to perform image signal processing (e.g., filtering, tone mapping, stitching, and/or encoding) to generate output images based on image data from the image sensor(s) 312. The processing apparatus 320 may include one or more processors having single or multiple processing cores. In some implementations, the processing apparatus 320 may include an application specific integrated circuit (ASIC). For example, the processing apparatus 320 may include a custom image signal processor. The processing apparatus 320 may exchange data (e.g., image data) with other components of the image capture device 300, such as the image sensor(s) 312, via the bus 380.

The processing apparatus 320 may include memory, such as a random-access memory (RAM) device, flash memory, or another suitable type of storage device, such as a non-transitory computer-readable memory. The memory of the processing apparatus 320 may include executable instructions and data that can be accessed by one or more processors of the processing apparatus 320. For example, the processing apparatus 320 may include one or more dynamic random-access memory (DRAM) modules, such as double data rate synchronous dynamic random-access memory (DDR SDRAM). In some implementations, the processing apparatus 320 may include a digital signal processor (DSP). More than one processing apparatus may also be present or associated with the image capture device 300.

The data interface components 330 enable communication between the image capture device 300 and other electronic devices, such as a remote control, a smartphone, a tablet computer, a laptop computer, a desktop computer, or a storage device. For example, the data interface components 330 may be used to receive commands to operate the image capture device 300, transfer image data to other electronic devices, and/or transfer other signals or information to and from the image capture device 300. The data interface components 330 may be configured for wired and/or wireless communication. For example, the data interface components 330 may include an I/O interface 332 that provides wired communication for the image capture device, which may be a USB interface (e.g., USB type-C), a high-definition multimedia interface (HDMI), or a FireWire interface. The data interface components 330 may include a wireless data interface 334 that provides wireless communication for the image capture device 300, such as a Bluetooth interface, a ZigBee interface, and/or a Wi-Fi interface. The data interface components 330 may include a storage interface 336, such as a memory card slot configured to receive and operatively couple to a storage device (e.g., a memory card) for data transfer with the image capture device 300 (e.g., for storing captured images and/or recorded audio and video).

The movement sensors 340 may detect the position and movement of the image capture device 300. The movement sensors 340 may include a position sensor 342, an accelerometer 344, or a gyroscope 346. The position sensor 342, such as a global positioning system (GPS) sensor, is used to determine a position of the image capture device 300. The accelerometer 344, such as a three-axis accelerometer, measures linear motion (e.g., linear acceleration) of the image capture device 300. The gyroscope 346, such as a three-axis gyroscope, measures rotational motion (e.g., rate of rotation) of the image capture device 300. Other types of movement sensors 340 may also be present or associated with the image capture device 300.

The power components 350 may receive, store, and/or provide power for operating the image capture device 300. The power components 350 may include a battery interface 352 and a battery 354. The battery interface 352 operatively couples to the battery 354, for example, with conductive contacts to transfer power from the battery 354 to the other electronic components of the image capture device 300. The power components 350 may also include an external interface 356, and the power components 350 may, via the external interface 356, receive power from an external source, such as a wall plug or external battery, for operating the image capture device 300 and/or charging the battery 354 of the image capture device 300. In some implementations, the external interface 356 may be the I/O interface 332. In such an implementation, the I/O interface 332 may enable the power components 350 to receive power from an external source over a wired data interface component (e.g., a USB type-C cable).

The user interface components 360 may allow the user to interact with the image capture device 300, for example, providing outputs to the user and receiving inputs from the user. The user interface components 360 may include visual output components 362 to visually communicate information and/or present captured images to the user. The visual output components 362 may include one or more lights 364 and/or more displays 366. The display(s) 366 may be configured as a touch screen that receives inputs from the user. The user interface components 360 may also include one or more speakers 368. The speaker(s) 368 can function as an audio output component that audibly communicates information and/or presents recorded audio to the user. The user interface components 360 may also include one or more physical input interfaces 370 that are physically manipulated by the user to provide input to the image capture device 300. The physical input interfaces 370 may, for example, be configured as buttons, toggles, or switches. The user interface components 360 may also be considered to include the microphone(s) 314, as indicated in dotted line, and the microphone(s) 314 may function to receive audio inputs from the user, such as voice commands.

The image capture device 300 may be used to implement some or all of the techniques described in this disclosure, such as the technique 600 described in FIG. 6.

Figure 4:
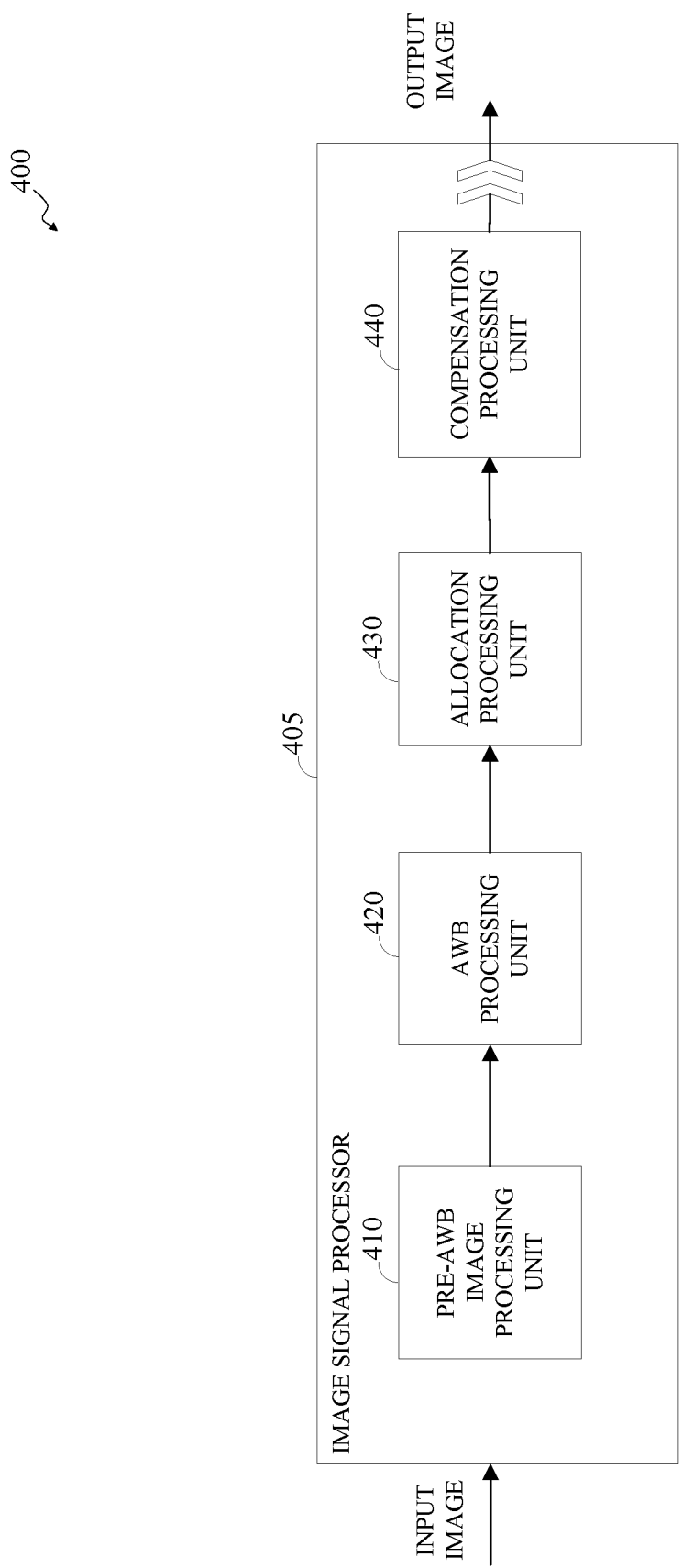
FIG. 4 is a block diagram of an example of an image processing pipeline.

FIG. 4 is a block diagram of an example of an image processing pipeline 400. In some implementations, the image processing pipeline 400 may be included in an image capture device, such as the image capture device 100 shown in FIGS. 1A-B, the image capture device 200 shown in FIGS. 2A-D, the image capture device 300 shown in FIG. 3. In some implementations, the image processing pipeline 400 may represent functionality of an integrated circuit, for example, including an image capture unit or image signal processor. In some implementations, the image processing pipeline 400 may include an image signal processor (ISP) 405.

The image signal processor 405 may receive an input image signal (i.e., an input image) and output an output image. For example, an image capture device (not shown), such as the first image capture device 226 and the second image capture device 228 shown in FIG. 2C, may capture an image, or a portion thereof, and may send, or transmit, the captured image, or image portion, to the image signal processor 405 as input image signals. In some implementations, an image, or frame, such as an image, or frame, included in the input image signal, may be one of a sequence or series of images or frames of a video, such as a sequence, or series, of frames captured at a rate, or frame rate, which may be a number or cardinality of frames captured per defined temporal period, such as twenty-four, thirty, or sixty frames per second.

The image signal processor 405 may include a pre-AWB image processing unit 410, which may include obtaining image statistics and data for each of the input image signals which account for differences between each of the image capture devices, determining a luminance level e.g. determining a light or dark environment, determining parameters for AWB algorithms, and the like.

The image signal processor 405 may include an AWB processing unit 420, which may determine a number of input image parameters including, but not limited to, illuminant, underwater ratios, global scale, presets, color temperatures, and color matrices. The AWB processing unit 420 may use gray world method, perfect reflector method, fuzzy rule method, Chikane's method, and other known or to be developed methods and techniques to determine the input image parameters.

The image signal processor 405 may include an allocation processing unit 430, which may apply a per image capture device factor for each image capture device to the input image parameters such as the global scale to determine an image capture device scale for each image capture device, for example.

The image signal processor 405 may include a compensation processing unit 440, which may apply each image capture device scale to the appropriate input image signals to perform AWB compensation or correction.

In the examples described herein, a thumbnail may refer to a reduced-size copy of an original image. An augmented image may reflect edge statistics, spatial statistics, or any type of information extracted from the pixel values of an image I. Augmented images may be used to process multiple sources of color information beyond individual pixel color. Metadata may be associated with an input image and may include an exposure time, an aperture setting, an ISO setting, algorithmic information, semantics, or any combination thereof. Semantics may include a detected face, a detected object, other high-level information, or any combination thereof. Example scene classifications may include a snow scene, an underwater scene, a beach scene, a vegetation scene, an urban scene, an indoor scene, or any combination thereof. These scene classifications are provided as examples, and it is understood that any scene description may be used as a scene classification.

Figure 5:
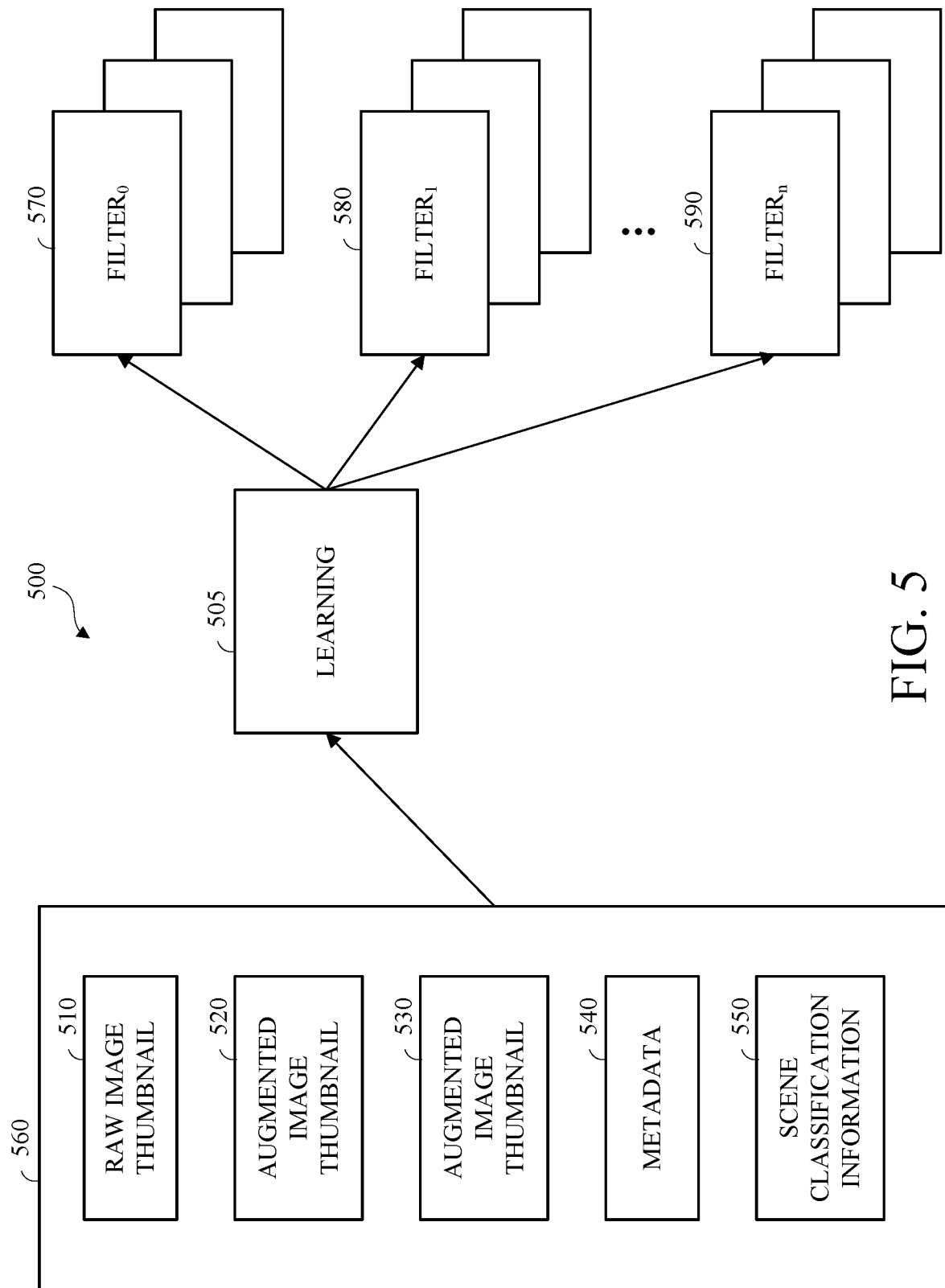
FIG. 5 is a flow diagram of an example of an offline learning step of a scene-based automatic white balance method.

FIG. 5 is a flow diagram of an example of an offline learning step of a scene-based AWB method 500. The offline learning step of a scene-based AWB method 500 may be performed by a processor such as processing apparatus 320 shown in FIG. 3. The offline learning step of a scene-based AWB method 500 includes a learning step 505. The learning step 505 includes obtaining a raw image thumbnail 510, one or more augmented image thumbnails 520, 530, metadata 540, scene classification information 550, or any combination thereof. Although any number of augmented image thumbnails may be obtained, the offline AWB method 500 shows obtaining two augmented image thumbnails 520, 530 for simplicity and clarity. The raw image thumbnail 510, one or more augmented image thumbnails 520, 530, metadata 540, scene classification information 550, or any combination thereof, may be obtained from a database 560. The database 560 may be an on-board database of an image capture device or a cloud-based database.

The raw image thumbnail 510, the augmented image thumbnail 520, and the augmented image thumbnail 530 may each be associated with a respective reference automatic white balance image. The raw image thumbnail 510, the augmented image thumbnail 520, and the augmented image thumbnail 530 may be used to determine one or more histograms. The histograms may each be a log-chrominance histogram where the color space of an image is normalized by the green component. The histograms may be obtained by performing a log transformation of B/G pixels versus the R/G pixels.

The learning step 505 may include determining a first filter 570. The first filter 570 may be learned from one or more different instances of the raw image thumbnail 510 and scene classification information 550. In this example, the scene classification information 550 may be associated with the raw image thumbnail 510. The first filter 570 may be a filter stack where each filter of the filter stack is associated with a scene class. The learning step 505 may include determining a probability of each scene class for the raw image thumbnail 510. The learning step 505 may include determining a second filter 580. The second filter 580 may be learned from one or more different instances of the augmented image thumbnail 520 and scene classification information 550. In this example, the scene classification information 550 may be associated with the augmented image thumbnail 520. The second filter 580 may be a filter stack where each filter of the filter stack is associated with a scene class. The learning step 505 may include determining a probability of each scene class for the augmented image thumbnail 520. The learning step 505 may include determining a third filter 590. The third filter 590 may be learned from one or several different instances of the augmented image thumbnail 530 and scene classification information 550. In this example, the scene classification information 550 may be associated with the augmented image thumbnail 530. The third filter 590 may be a filter stack where each filter of the filter stack is associated with a scene class. The learning step 505 may include determining a probability of each scene class for the augmented image thumbnail 530. The raw image thumbnail, the one or more augmented image thumbnails, or both, may each be associated with reference automatic white balance gains. The learning step of a scene-based AWB method 500 may include outputting or storing the first filter 570, the second filter 580, the third filter 590, or any combination thereof.

FIG. 6 is a flow diagram of an example of an in-device scene-based AWB method 600. The in-device scene-based AWB method 600 may be used in conjunction with the offline learning step of a scene-based AWB method 500. The in-device scene-based AWB method 600 may be performed by a processor such as processing apparatus 320 shown in FIG. 3. The in-device scene-based AWB method 600 includes an inference step 605. The inference step 605 includes obtaining a raw image thumbnail 610, one or more augmented image thumbnails 620, 630, metadata 640, scene classification information 650, or any combination thereof. Although any number of augmented image thumbnails may be obtained, the in-device AWB method 600 shows obtaining two augmented image thumbnails 620, 630 for simplicity and clarity. The raw image thumbnail 610, the metadata 640, the scene classification information 650, or any combination thereof, may be based on an input image. The one or more augmented image thumbnails 620, 630, may be derived from the raw image thumbnail 610. The in-device AWB method 600 may include determining a scene classification. The scene classification may be based on an input image. The input image may be referred to as a raw input image.

The raw image thumbnail 610, the augmented image thumbnail 620, and the augmented image thumbnail 630 may be used to determine a histogram. The histograms may each be a log-chrominance histogram where the color space of an image is normalized by the green component. The histograms may be obtained by performing a log transformation of B/G pixels versus the R/G pixels.

The in-device AWB method 600 may include obtaining a first filter 660. The first filter 660 may be learned from one or more different instances of a raw image thumbnail and a scene classification determined during a learning step such as the raw image thumbnail 510 and scene classification information 550 shown in FIG. 5. The first filter 660 may be a filter stack where each filter of the filter stack is associated with a scene class. The inference step 605 may include determining a probability of each scene class for the raw input image. The inference step 605 may include determining a second filter 670. The second filter 670 may be learned from one or more different instances of an augmented image thumbnail and a scene classification determined during a learning step such as the augmented image thumbnail 520 and scene classification information 550 shown in FIG. 5. The second filter 670 may be a filter stack where each filter of the filter stack is associated with a scene class. The inference step 605 may include determining a probability of each scene class for the augmented image thumbnail 620. The inference step 605 may include determining a third filter 680. The third filter 680 may be learned from one or more different instances of an augmented image thumbnail and a scene classification determined during a learning step such as the augmented image thumbnail 530 and scene classification information 550 shown in FIG. 5. The third filter 680 may be a filter stack where each filter of the filter stack is associated with a scene class. The inference step 605 may include determining a probability of each scene class for the augmented image thumbnail 630. The in-device AWB method 600 may include combining 685 the first filter 660, the second filter 670, the third filter 680, or any combination thereof. The inference step 605 may include performing a convolution of the combined filters with histograms to obtain scene-specific white balance weights 690. The scene-specific white balance weights 690 may be applied to an input image to obtain a processed image. In some examples, the scene-specific white balance weights 690 may be applied to an input image based on the determined probability of each respective scene class to obtain a processed image.

Figure 7:
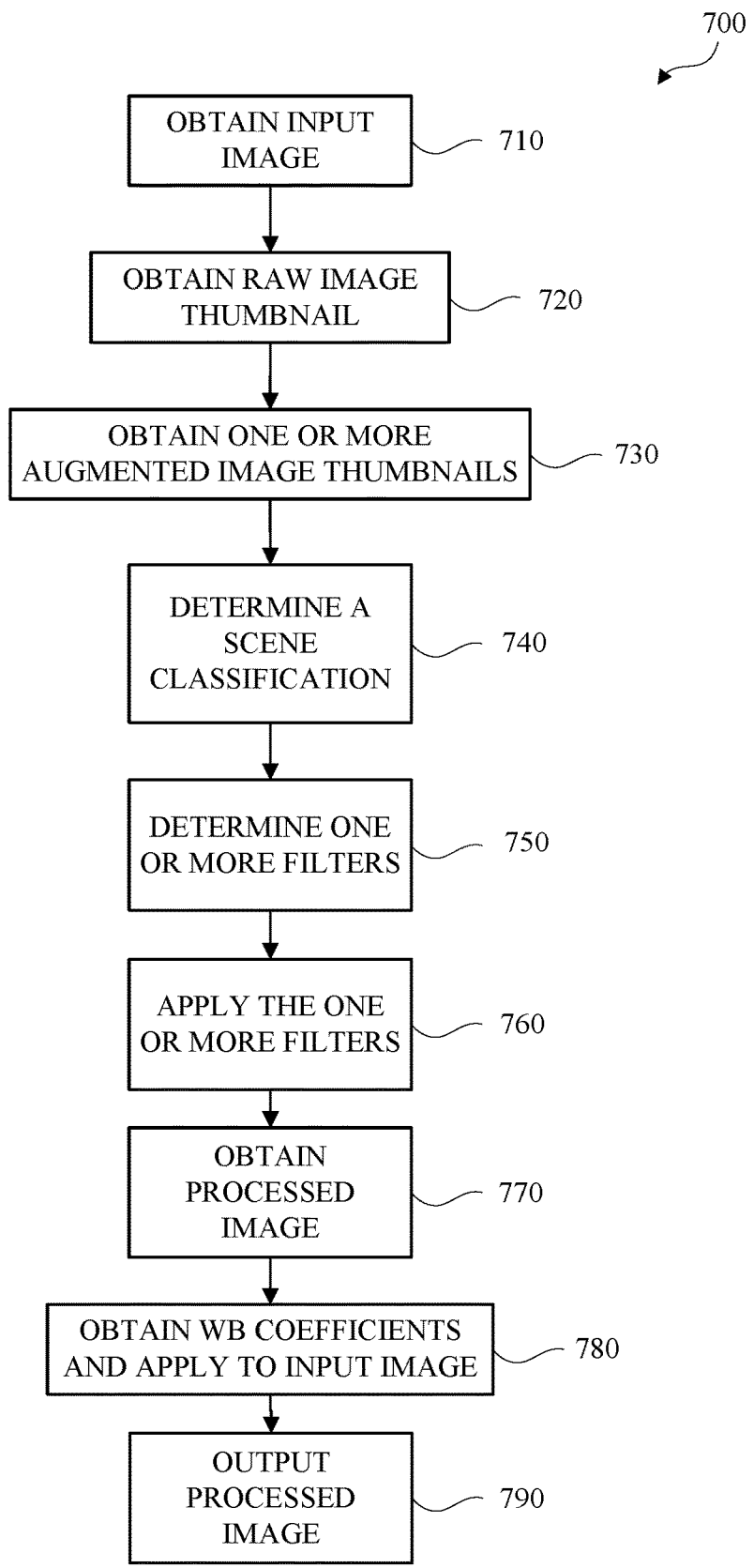
FIG. 7 is a flow diagram of an example of a scene-based automatic white balance method.

FIG. 7 is a flow diagram of an example of a scene-based AWB method 700. The scene-based AWB method 700 may be performed by a processor such as processing apparatus 320 shown in FIG. 3. The scene-based AWB method 700 includes obtaining an input image 710. The scene-based AWB method 700 includes obtaining a raw image thumbnail 720 and obtaining one or more augmented image thumbnails 730.

The raw image thumbnail, the one or more augmented image thumbnails, or both, may each be used to determine a histogram. The histograms may each be a log-chrominance histogram where the color space of an image is normalized by the green component. The histograms may be obtained by performing a log transformation of B/G pixels versus the R/G pixels.

The scene-based AWB method 700 may include determining a scene classification 740. The scene classification may be obtained from an external processor independent from AWB based on an input image or recently acquired frames.

The scene-based AWB method 700 may include determining one or more filters 750. The one or more filters may be determined or learned from one or more different instances of image thumbnails and scene classification information. The one or more filters may be a filter stack where each filter of the filter stack is associated with a scene class. The scene-based AWB method 700 includes applying 760 the one or more filters to log-chrominance histograms to obtain white balance weights to obtain 770 a processed image. In some examples, the scene-based AWB method 700 includes applying 760 the one or more filters to log-chrominance histograms based on the determined probability of each respective scene class to obtain scene-specific white balance weights to obtain 770 a processed image. The scene-based AWB method 700 may include obtaining white balance coefficients 780. The scene-based AWB method 700 may include applying the white balance coefficients to the input image to output 790 the processed image.

Figure 8:
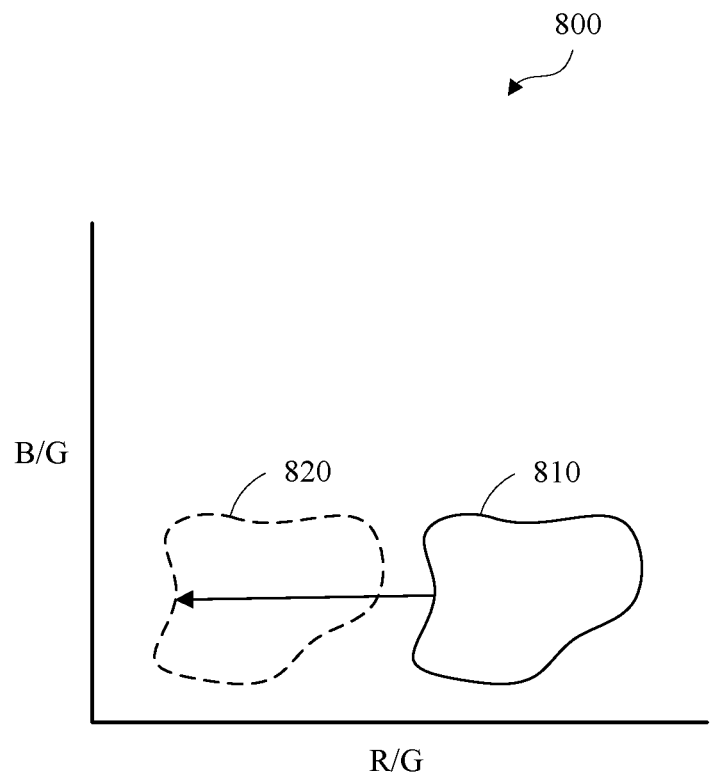
FIG. 8 is a diagram of an example of a histogram to compute a reference translation vector.

FIG. 8 is a diagram of an example of a histogram 800 to compute a reference translation vector. The reference translation vector may be referred to as one or more scene-specific white balance weights. As shown in FIG. 8, the histogram 800 is a log-chrominance histogram where the color space of an image is normalized by brightness. The histogram 800 may be obtained by performing a log transformation of B/G pixels versus the R/G pixels.

As shown in FIG. 8, the histogram 800 includes a color area 810. For example, the image capture device may perform the in-device AWB method 600 shown in FIG. 6 to calculate the reference translation vector. The reference translation vector may be used to perform an AWB correction to shift the color area 810 to a known reference color area such as color area 820.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An image capture device comprising:
an image sensor configured to obtain an input image, wherein the input image is a raw image; and
a processor configured to:
obtain a raw image thumbnail and compute a histogram based on the raw image thumbnail;
obtain a first augmented image thumbnail and a second augmented image thumbnail, wherein the first augmented image thumbnail is used to determine a second histogram and the second augmented image thumbnail is used to determine a third histogram;
determine a scene classification for the raw image;
determine a first filter, a second filter, and a third filter, wherein the first filter is learned from one or more different instances of the raw image thumbnail and the determined scene classification, the second filter is learned from one or more different instances of the first augmented image thumbnail and the determined scene classification, and the third filter is learned from one or more different instances of the second augmented image thumbnail and the determined scene classification; and
store the first filter, the second filter, and the third filter.

2. The image capture device of claim 1, wherein the first filter comprises stacked filters, and wherein one of the stacked filters corresponds to a scene classification.

3. The image capture device of claim 2, wherein the scene classification includes a snow scene, an underwater scene, a beach scene, a vegetation scene, an urban scene, or an indoor scene.

4. The image capture device of claim 3, wherein the processor is further configured to determine a probability of the scene classification.

5. The image capture device of claim 4, wherein the processor is configured to apply the first filter, the second filter, and the third filter to one or more of the histogram, the second histogram, and the third histogram based on the determined probability of the scene classification to obtain scene-specific white balance weights and output a processed image.

6. The image capture device of claim 1, wherein the processor if further configured to obtain metadata associated with the input image.

7. The image capture device of claim 6, wherein the metadata associated with the input image includes an exposure time, an aperture setting, an ISO setting, algorithmic information, or semantics.

8. The image capture device of claim 7, wherein the metadata includes semantics, and wherein the semantics include a detected face or a detected object.

9. The image capture device of claim 1, further comprising:
a database configured to store the raw image thumbnail, the first augmented image thumbnail, and the second augmented image thumbnail.

10. The image capture device of claim 9, wherein the processor is further configured to obtain the scene classification from an external processor, wherein the scene classification is based on the raw image or recently acquired raw images.

11. The image capture device of claim 9, wherein the raw image thumbnail, the first augmented image thumbnail, and the second augmented image thumbnail are each associated with an exposure time, an aperture setting, an ISO setting, algorithmic information, or semantics.

12. An image capture device comprising:
an image sensor configured to obtain an input image; and
a processor configured to:
obtain a raw image thumbnail based on the input image;
compute a first histogram based on the raw image thumbnail;
obtain a first augmented image thumbnail and a second augmented image thumbnail, wherein the first augmented image thumbnail is based on the raw image thumbnail and is used to determine a second histogram, and the second augmented image thumbnail is based on the raw image thumbnail and is used to determine a third histogram;
determine a scene classification for the input image;
obtain a first filter, a second filter, and a third filter, wherein the first filter is learned from one or more different instances of the raw image thumbnail and the determined scene classification, the second filter is learned from one or more different instances of the first augmented image thumbnail and the determined scene classification, and the third filter is learned from one or more different instances of the second augmented image thumbnail and the determined scene classification;

combine the first filter, the second filter, and the third filter to obtain a combined filter;

perform a convolution of the combined filter to obtain an image from which the scene-specific white balance weights are retrieved;

apply the scene-specific white balance weights to the input image to obtain a processed image; and output the processed image.

13. The image capture device of claim 12, wherein the first filter comprises stacked filters, and wherein one of the stacked filters corresponds to a scene classification.

14. The image capture device of claim 13, wherein the scene classification includes a snow scene, an underwater scene, a beach scene, a vegetation scene, an urban scene, or an indoor scene.

15. The image capture device of claim 14, wherein the processor is further configured to determine a probability of the scene classification.

16. The image capture device of claim 12, wherein the processor if further configured to obtain metadata associated with the input image.

17. The image capture device of claim 16, wherein the metadata associated with the input image includes an exposure time, an aperture setting, an ISO setting, algorithmic information, or semantics.

18. A method comprising:

obtaining an input image;

obtaining a raw image thumbnail;

obtaining an augmented image thumbnail;

computing a histogram from an image thumbnail;

determining a scene classification result based on the input image;

determining a filter; and applying the filter to the histogram to determine white balance correction coefficients and obtain a processed image.

19. The method of claim 18, wherein the filter is a stacked filter, and wherein each filter of the stacked filter corresponds to a respective scene classification.

20. The method of claim 19, wherein the respective scene classification includes a snow scene, an underwater scene, a beach scene, a vegetation scene, an urban scene, or an indoor scene.

* * * * *